US012427811B2

(12) United States Patent
Yu

(10) Patent No.: US 12,427,811 B2
(45) Date of Patent: Sep. 30, 2025

(54) TIRE PRESSURE DETCTOR BLUETOOTH TRANSMISSION SYSTEM AND PROCESS

(71) Applicant: Chih-Wei Yu, Taipei (TW)

(72) Inventor: Chih-Wei Yu, Taipei (TW)

(73) Assignee: SYSGRATION LTD., Taipei (TW)

( * ) Notice: Subject to any disclaimer, the term of this patent is extended or adjusted under 35 U.S.C. 154(b) by 21 days.

(21) Appl. No.: 17/886,477

(22) Filed: Aug. 12, 2022

(65) Prior Publication Data

US 2023/0074400 A1  Mar. 9, 2023

(30) Foreign Application Priority Data

Sep. 3, 2021 (TW) ................. 110132784

(51) Int. Cl.
*B60C 23/04* (2006.01)
*B60C 23/20* (2006.01)
*G06F 8/65* (2018.01)
*H04W 4/80* (2018.01)

(52) U.S. Cl.
CPC ...... *B60C 23/0447* (2013.01); *B60C 23/0479* (2013.01); *B60C 23/0488* (2013.01); *B60C 23/20* (2013.01); *G06F 8/65* (2013.01); *H04W 4/80* (2018.02)

(58) Field of Classification Search
CPC ............ B60C 23/0447; B60C 23/0479; B60C 23/0488; B60C 23/20; B60C 23/0471; G06F 8/65; H04W 4/80; Y02D 30/70
See application file for complete search history.

(56) References Cited

U.S. PATENT DOCUMENTS 10,394,542 B1 *   8/2019  Poenaru ............. G06F 11/1433
2017/0136834 A1 * 5/2017  Chong ................ B60C 23/0479
2019/0248193 A1 * 8/2019  Scheibenzuber ... B60C 23/0471

* cited by examiner

*Primary Examiner* — Davetta W Goins
*Assistant Examiner* — Sharmin Akhter

(57) ABSTRACT

A tire pressure detector Bluetooth transmission system and process are provided. The tire pressure detector Bluetooth transmission system includes a monitoring module for detecting pressure, and a first Bluetooth module for transmitting and receiving Bluetooth signals; a host terminal, including a second Bluetooth module for transmitting and receiving Bluetooth signals, and a network module for transmitting and receiving signals; and a server, transmitting signals with the network module; wherein the server stores a firmware package to be installed on the monitoring module and the first Bluetooth module. A Bluetooth wireless transmission is provided between the tire pressure detector and the host terminal.

12 Claims, 3 Drawing Sheets

TIRE PRESSURE DETCTOR BLUETOOTH TRANSMISSION SYSTEM AND PROCESS

CROSS-REFERENCE TO RELATED PATENT APPLICATION

This application claims the benefit of priority to Taiwan Patent Application No. 110132784, filed on 3 Sep. 2021. The entire content of the above identified application is incorporated herein by reference.

FIELD OF THE DISCLOSURE

The present disclosure relates to a system of tire pressure detector communication, and more particularly to the system including the upgrade process of tire pressure detector firmware and the method of obtaining the firmware package.

BACKGROUND OF THE DISCLOSURE

The tire pressure value is an important value for the vehicle to drive safely. With the advancement of technology, the tire pressure value detecting method has improved a lot from measuring wheel by wheel manually before departure to automatically measuring and transmitting to the monitoring screen by the electronic equipment. It has become more convenient.

Generally, in a completed tire pressure detecting system, at least each vehicle wheel would be equipped with a tire pressure detector, and a primary system of the car would be equipped with a device for monitoring data. Due to the wheels will rotate at high speed during driving, wired transmission is not suitable for transmission between the tire pressure detector and the device monitoring data, and only wireless transmission of signals is suitable. Currently, the common wireless signal transmission methods on the market are RF (Radio frequency) and LF (Low frequency). However, the above-mentioned two wireless signals have disadvantages. Firstly, RF can only provide simplex transmission. That is to say, the signal can only be transmitted from the tire pressure detector to the monitoring device. Thus, there is no way to upgrade the firmware by transmitting data to the tire pressure detector from the monitoring device, and the LF coils must be used to transmit and receive data to solve this problem. Therefore, at least four LF coils must be installed on the car to achieve complete data transmission function, so that the cost would be too high, and installing multiple LF coils also results in more interference signals will be received.

SUMMARY OF THE DISCLOSURE

The present disclosure provides a Bluetooth wireless transmission between a tire pressure detector and a host terminal, which solves the conventional problems that RF (Radio frequency) can only transmit in one direction and the transmission distance of LF (Low frequency) is too short.

In order to achieve the above-mentioned objective and effort, the present disclosure provides a tire pressure detector Bluetooth transmission system, including a monitoring module for detecting pressure, and a first Bluetooth module for transmitting and receiving Bluetooth signals; a host terminal, including a second Bluetooth module for transmitting and receiving Bluetooth signals, and a network module for transmitting and receiving signals; and a server, transmitting signals with the network module; wherein the server stores a firmware package to be installed on the monitoring module and the first Bluetooth module.

The present disclosure further provides a transmission process of a tire pressure detector Bluetooth transmission system, including: step 1: a server wirelessly transmits a firmware package to a host terminal, and the host terminal receives the firmware package through a network module, and then the network module transmits the firmware package to a second Bluetooth module; step 2: the host terminal transmits the firmware package to a paired tire pressure detector through the second Bluetooth module, and the tire pressure detector receives the firmware package through a first Bluetooth module; and step 3: the first Bluetooth module copies the content of the firmware package, and the tire pressure detector further includes a monitoring module, and the content of the firmware package is installed on the sensing module.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
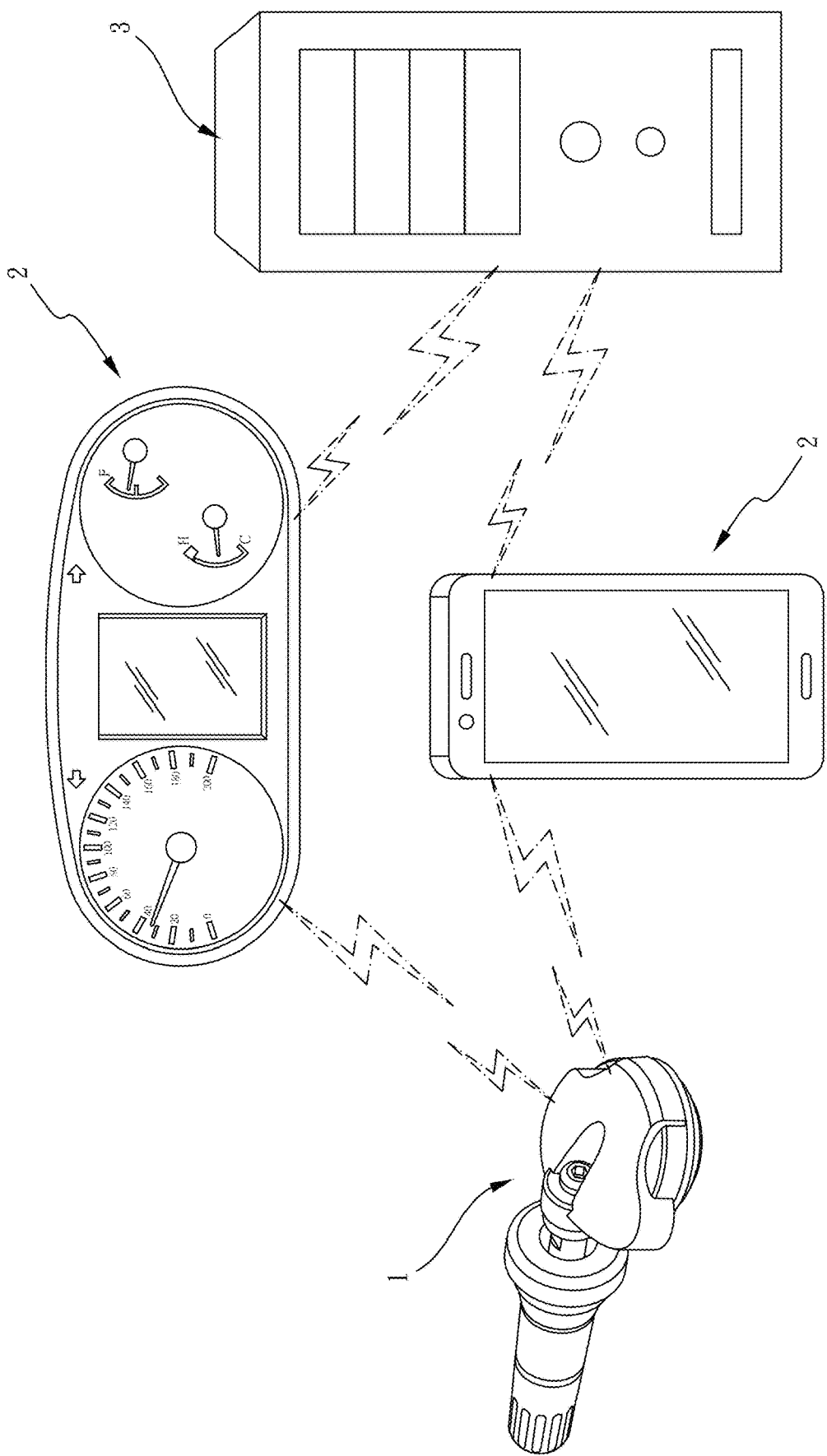
FIG. 1 is a framework view of the system of the present disclosure.
Figure 2:
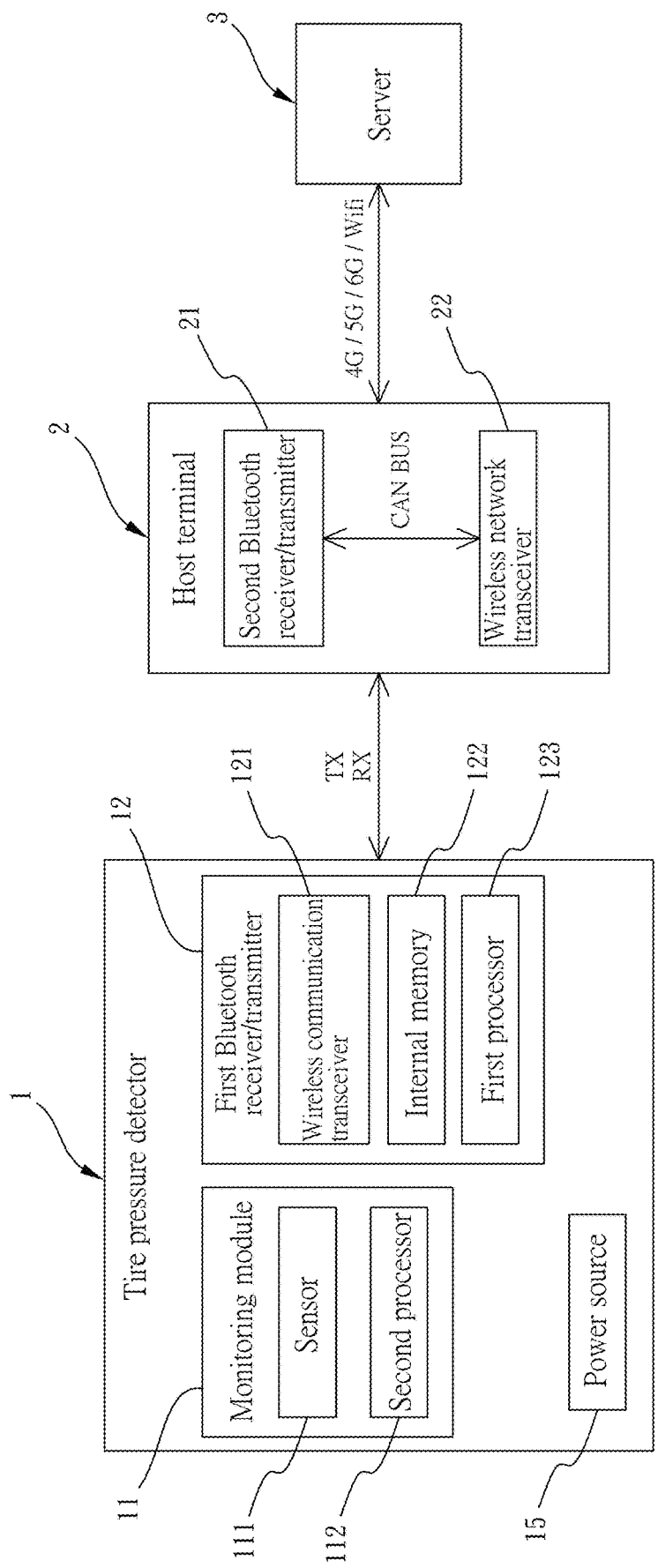
FIG. 2 is a first block diagram of the system of the present disclosure.
Figure 3:
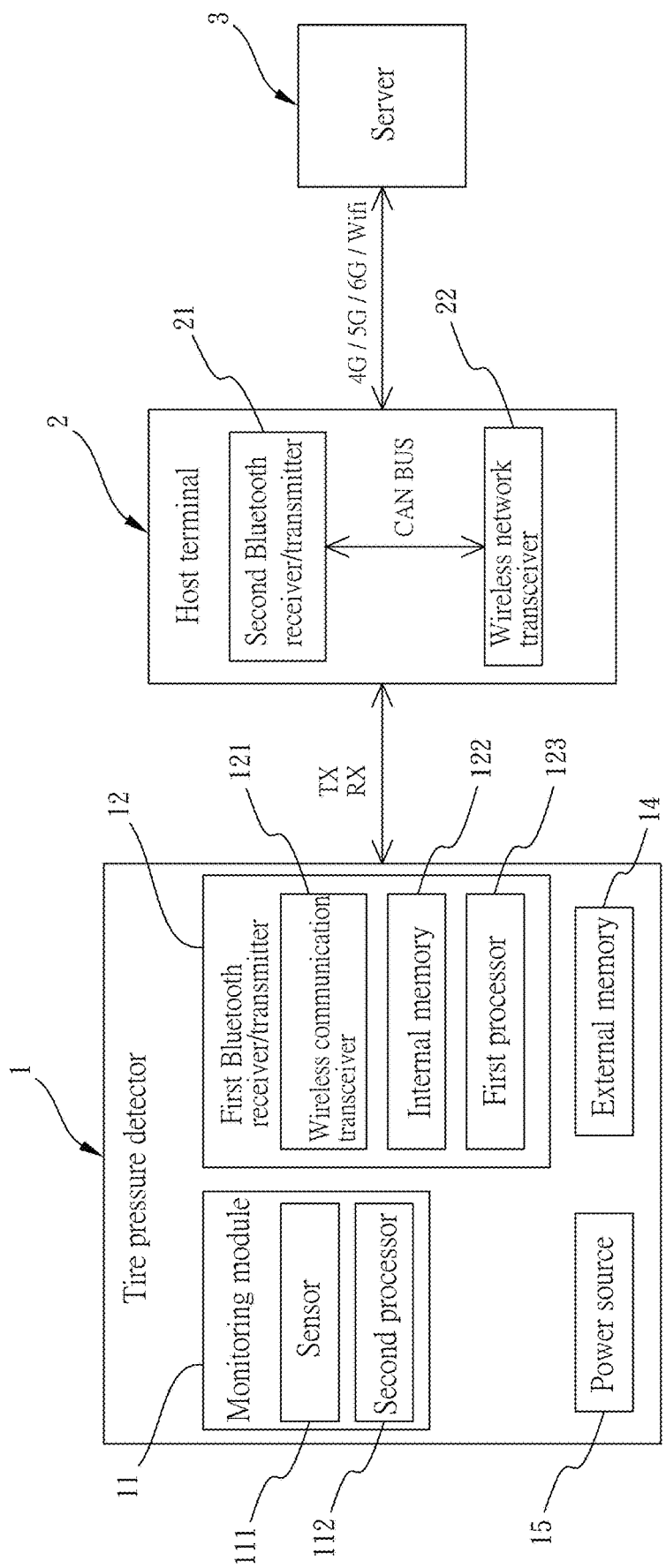
FIG. 3 is a second block diagram of the system of the present disclosure.

For a detailed understanding of the embodiments of the present disclosure, the description can be read in conjunction with the drawings. As shown in FIGS. 1-3, which is a tire pressure detector Bluetooth transmission system, comprising: a tire pressure detector 1, a host terminal 2 and a server 3. The tire pressure detector 1 includes a monitoring module 11 and a first Bluetooth module for 12, in which the monitoring module 11 is used to detect pressure, and the first Bluetooth module 12 is used for transmitting and receiving Bluetooth signals. The host terminal 2 includes a second Bluetooth module 21 and a network module 22, the second Bluetooth module 21 is used for transmitting and receiving Bluetooth signals, and the network module 22 is used for transmitting and receiving signals. The server 3 transmits signals with the network module 22; wherein the server 3 stores a firmware package to be installed in the monitoring module 11 and the first Bluetooth module 12.

For example, the host terminal 2 can be a mobile phone, a car monitoring device, etc. In the drawings, TX represents transmitting, and RX represents receiving.

The power source 15 inside the tire pressure detector 1 can be a disposable battery or a rechargeable battery, and the charging method of the rechargeable battery can be solar energy, wireless charging, or wired charging.

As shown in the framework of the system of the present disclosure, it can be understood that the wireless transmission between a tire pressure detector and a host terminal is operated by a Bluetooth signal. In addition to bidirectional transmission (duplex), the effective transmission distance of Bluetooth signals for wireless transmission is usually within 10 meters, far more than the transmission distance of traditional LF signal (50 cm). Therefore, there is no need to provide multiple coils as in the conventional art, which indeed improves the disadvantages of RF and LF signal transmission.

The present disclosure further provides a transmission process of a tire pressure detector Bluetooth transmission system, including: step 1: a server 3 wirelessly transmits a firmware package to a host terminal 2, and the host terminal 2 receives the firmware package through a network module 22, and then the network module 22 transmits the firmware package to a second Bluetooth module 21; step 2: the host terminal 2 transmits the firmware package to a paired tire pressure detector 2 through the second Bluetooth module 21 (The second Bluetooth module 21 is responsible for connecting to the tire pressure detector 1 and executing the OTA program), and the tire pressure detector 1 receives the firmware package through a first Bluetooth module 12; and step 3: the first Bluetooth module 12 copies the content of the firmware package, and the tire pressure detector 1 further includes a monitoring module 11, and the content of the firmware package is installed in the monitoring module 11.

As presented in FIG. 2, the first Bluetooth module 12 includes a wireless communication unit 121, an internal memory 122 and a first processor 123. The internal memory 122 is used for storing the firmware package. In step 3, the firmware package is first stored in the internal memory 122 before starting to install the contents of the firmware package, and the first processor 123 is used for processing the signals transmitted and received by the wireless communication unit 121, for example, the second Bluetooth module 21 downloads the firmware package to the internal memory 122 of the first Bluetooth module 12, copies the contents of the firmware package to update the firmware, and then copies the contents of the firmware package to update the firmware of the monitoring module 11.

Further, as shown in FIG. 2 and FIG. 3, a framework of the monitoring module 11 is provided. The monitoring module includes a sensor 111, and a second processor 121 for processing the values detected by the sensor 111.

Furthermore, the monitoring module 11 can be used to detect temperature and acceleration.

As shown in FIG. 3, the tire pressure detector 1 includes an external memory 14. In step 3, the firmware package is first stored in the external memory 14 before starting to install the contents of the firmware package to the first Bluetooth module 12. For example, the second Bluetooth module 21 downloads the firmware package to the external memory 14 of the tire pressure detector 1, transfers and copies the contents of the firmware package to update the firmware of the first Bluetooth module 12, and then copies the contents of the firmware package to update the firmware of the monitoring module 11.

As presented in FIG. 2 and FIG. 3, the communication method between the second Bluetooth module 21 and the network module 22 can be CAN (Controller Area Network) bus, SPI (Serial Peripheral Interface), UART (Universal Asynchronous Receiver/Transmitter), or I2C (Inter-Integrated Circuit).

As presented in FIG. 2 and FIG. 3, the signal transmission method between the server 3 and the network module 22 can be one of Wi-Fi, 5G (5th generation mobile networks), 4G (The fourth generation of mobile phone mobile communication technology standards), and 6G (6th generation mobile networks).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching and will be suggested to persons skilled in the art and are to be included within the spirit and purview of the present disclosure and scope of the appended claims.

In conclusion, the tire pressure detector Bluetooth transmission system and process of the present disclosure, in terms of practicability and cost-effectiveness, indeed meets the needs of industrial development.

What is claimed is:

1. A tire pressure detector Bluetooth transmission system, comprising:
   a tire pressure detector including a detecting member for detecting pressure, a first Bluetooth receiver/transmitter for transmitting and receiving Bluetooth signals and an external memory, the first Bluetooth receiver/transmitter including an internal memory;
   a host terminal including a second Bluetooth receiver/transmitter for transmitting and receiving Bluetooth signals, and a wireless network transceiver for transmitting and receiving signals, and
   a server transmitting signals with the wireless network transceiver, wherein the server stores a firmware package for the detecting member and the first Bluetooth receiver/transmitter to be installed, the internal memory and the external memory store the firmware package, the firmware package is first stored separately in the internal memory and the external memory before the tire pressure detector starts installing a content of the firmware package to the detecting member and the first Bluetooth receiver/transmitter.

2. The tire pressure detector Bluetooth transmission system according to claim 1, wherein the first Bluetooth receiver/transmitter includes a wireless communication transceiver, the internal memory for storing the firmware package, and a first processor for processing the signals transmitted and received by the wireless communication transceiver.

3. The tire pressure detector Bluetooth transmission system according to claim 1, wherein the detecting member includes a sensor, and a second processor for processing the values detected by the sensor.

4. The tire pressure detector Bluetooth transmission system according to claim 1, wherein the detecting member can be used to detect temperature and acceleration.

5. The tire pressure detector Bluetooth transmission system according to claim 1, wherein the communication method between the second Bluetooth receiver/transmitter and the wireless network transceiver is CAN (Controller Area Network) bus, SPI (Serial Peripheral Interface), UART (Universal Asynchronous Receiver/Transmitter), or I2C (Inter-Integrated Circuit).

6. The tire pressure detector Bluetooth transmission system according to claim 1, wherein the signal transmission method between the server and the wireless network transceiver can be one of Wi-Fi, 5G (5th generation mobile networks), 4G (The fourth generation of mobile phone mobile communication technology standards), or 6G (6th generation mobile networks).

7. A transmission process of a tire pressure detector, comprising:
   Step 1: a server wirelessly sends a firmware package to a host terminal, the host terminal receives the firmware package through a wireless network transceiver and then the wireless network transceiver transmits the firmware package to a second Bluetooth receiver/transmitter;

Step 2: the host terminal transmits the firmware package to a paired tire pressure detector through the second Bluetooth receiver/transmitter, the tire pressure detector receives the firmware package by a first Bluetooth receiver/transmitter, and the tire pressure detector includes an external memory, and Step 3: the first Bluetooth receiver/transmitter copies a content of the firmware package, the tire pressure detector includes a detecting member, and the first Bluetooth receiver/transmitter includes an internal memory, the firmware package is first stored separately in the internal memory and the external memory, and then the content of the firmware package is installed to the detecting member and the first Bluetooth receiver/transmitter.

8. The transmission process of a tire pressure detector according to claim 7, wherein the first Bluetooth receiver/transmitter includes a wireless communication transceiver, the internal memory for storing the firmware package, and a first processor; wherein, in step 3, the first processor is used for processing the signals transmitted and received by the wireless communication transceiver.

9. The transmission process of a tire pressure detector according to claim 7, wherein the detecting member includes a sensor, and a second processor for processing the values detected by the sensor.

10. The transmission process of a tire pressure detector according to claim 7, wherein the detecting member can be used to detect temperature and acceleration.

11. The transmission process of a tire pressure detector according to claim 7, wherein the communication method between the second Bluetooth receiver/transmitter and the network transmitting/receiving member is CAN (Controller Area Network) bus, SPI (Serial Peripheral Interface), UART (Universal Asynchronous Receiver/Transmitter), or I2C (Inter-Integrated Circuit).

12. The transmission process of a tire pressure detector according to claim 7, wherein the signal transmission method between the server and the wireless network transceiver can be one of Wi-Fi, 5G (5th generation mobile networks), 4G (The fourth generation of mobile phone mobile communication technology standards), or 6G (6th generation mobile networks).

* * * * *